United States Patent
Poutievski et al.

(10) Patent No.: US 9,455,911 B1
(45) Date of Patent: Sep. 27, 2016

(54) IN-BAND CENTRALIZED CONTROL WITH CONNECTION-ORIENTED CONTROL PROTOCOLS

(71) Applicant: Google Inc., Mountain View, CA (US)

(72) Inventors: Leon Poutievski, Santa Clara, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 14/143,871

(22) Filed: Dec. 30, 2013

(51) Int. Cl.
*H04L 12/24* (2006.01)
*H04L 12/741* (2013.01)

(52) U.S. Cl.
CPC .................................. *H04L 45/745* (2013.01)

(58) Field of Classification Search
CPC ....... H04L 67/10; H04L 69/16; H04L 67/42; H04L 65/80; H04L 47/10; H04L 45/64; H04L 45/38; H04L 12/28; H04L 12/743
USPC ....... 370/235, 359, 389, 392, 394, 400, 401; 709/227
See application file for complete search history.

(56) References Cited

U.S. PATENT DOCUMENTS

| | | | |
|---|---|---|---|
| 7,400,634 B2 | 7/2008 | Higashitaniguchi et al. | |
| 2008/0205388 A1* | 8/2008 | Colville | H04L 45/26 370/389 |
| 2010/0161741 A1* | 6/2010 | Jiang | H04L 63/02 709/206 |
| 2010/0260183 A1* | 10/2010 | Miyoshi | H04L 45/00 370/392 |

OTHER PUBLICATIONS

Appendix A; InfiniBand Concepts; A1-A12, retrieved from the Internet on Dec. 30, 2013, at <http://www.cisco.com/en/US/docs/server_nw_virtual/2.9.0_update1/2.9.0_release/element_manager/appA.pdf>.
McKeown, N.; OpenFlow: Enabling Innovation in Campus Networks; (2008).
OpenFlow Switch Specification; Version 1.1.0 Implemented (Wire Protocol 0x02) (2011).
Pfister; An Introduction for the Infiniband Architecture; Chaper 42; pp. 617-632, retrieved from the Internet on Dec. 30, 2013, at <http://gridbus.csse.unimelb.edu.au/~raj/superstorage/chap42.pdf>.

\* cited by examiner

*Primary Examiner* — Charles C Jiang
*Assistant Examiner* — Wali Butt
(74) *Attorney, Agent, or Firm* — McDermott Will & Emery

(57) ABSTRACT

Aspects of the disclosure relate generally to switches responding to master controllers before establishing a secure connection in an in-band controlled network. In order to do so, a computing device may receive a request packet from a transmitting device, the request packet originating from a controller computer. When the request packet enters a designated port on the computing device, the computing device may identify routing data from the received request packet, the routing data indicating a path to respond to the controller computer. The computing device may next populate a table using the identified routing data of the request packet. The computing device may send a response packet to the controller computer using the identified routing data in the populated table. From here, a connection may be established between the computing device and controller computer.

17 Claims, 8 Drawing Sheets

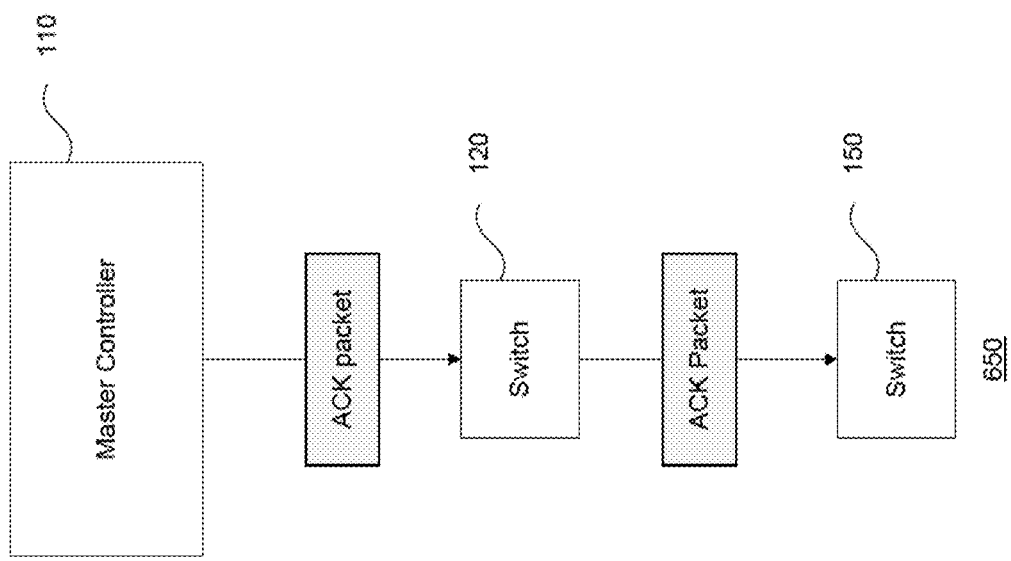
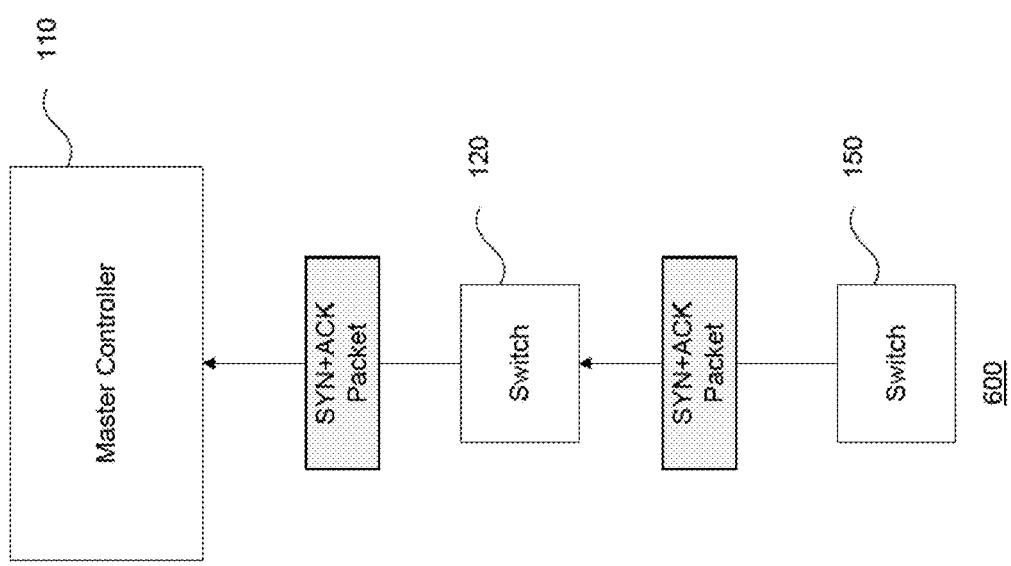

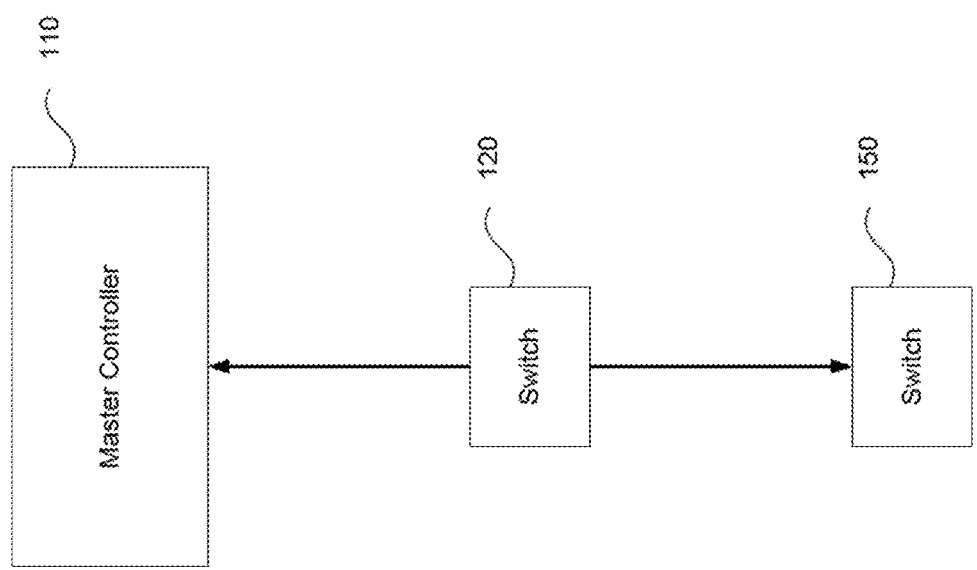

IN-BAND CENTRALIZED CONTROL WITH CONNECTION-ORIENTED CONTROL PROTOCOLS

BACKGROUND

In Software Defined Networking, system administrators can use controllers to remotely control devices on a network, such as servers and switches. OpenFlow protocol is one method for controllers to remotely program switches. Furthermore, Transmission Control Protocol ("TCP") may be implemented on networks employing OpenFlow technology. On in-band centralized networks and devices, a controller may attempt to indirectly establish a connection with a target switch by forwarding packets through an intermediary switch. One problem in this scenario, however, is that the target switch may not know how to respond to the controller after receiving a packet, because the target switch has not yet been programmed. If User Datagram Protocol ("UDP") was implemented, instructions to program the switch can be sent directly to the switch in a single packet. However, in TCP networks the target switch may not be programmed until a TCP connection is established. In this case, when a controller sends a packet to establish a connection with a target switch, the target switch may not know what path on a network to use to respond to the controller because it has not yet been programmed.

SUMMARY

Aspects of the disclosure provide a computer implemented system and method. The method includes receiving a request packet from a transmitting device, the request packet originating from a controller computer; when the received request packet enters one of a plurality of designated ports, identifying, using one or more processors, routing data from the received request packet, the routing data indicating a path to respond to the controller computer; populating, using the one or more processors, a table using the identified routing data of the request packet; sending, using the one or more processors, a response packet to the controller computer using the identified routing data in the populated table; receiving an answer packet from the controller computer based on the sent response packet; and establishing, using the one or more processors, a connection with the controller computer based on the request packet, the response packet, and the answer packet.

In one example, the method includes identifying specific criteria including an IP address of the controller computer and an identification of the transmitting device; and populating the table with the identified specific criteria. As another example, when the transmitting device goes down, receiving a new packet from a new transmitting device; and replacing, in the populated table, an indication of the transmitting device that has gone down with a new indication of the new transmitting device. As a further example, when the response packet is not confirmed at the controller computer, prohibiting sending of future response packets to the IP address of the controller computer for a period of time. In another example, the method also includes receiving a set of routing data from the controller computer; verifying the accuracy of the routing data in the populated table by comparing the identified routing data with the received set of routing data; and when the set of routing is not the same as the identified routing data, replacing the identified routing data with the set of routing data. As another example, the method includes verifying a digital signature in the received request packet to ensure the received request packet originated from the controller computer. By way of another example, when the connection is established with the controller computer, receiving a second set of routing data from the controller computer, the second set of routing data including information as to where to transmit data packets; using the second set of routing data when transmitting the data packets; and not using the identified routing data in the populated table to transmit the data packets.

Another aspect of the disclosure provides a system comprising one or more computing devices. These one or more computing devices are configured to receive a request packet from a transmitting device, the request packet originating from a controller computer; when the received request packet enters one of a plurality of designated ports, identifying routing data from the received request packet, and the routing data indicating a path to respond to the controller computer; populate a table using the identified routing data of the request packet; send a response packet to the controller computer using the identified routing data in the populated table; receive an answer packet from the controller computer based on the sent response packet; and establish a connection with the controller computer based on the request packet, the response packet, and the answer packet.

As another example, the system includes identifying the routing data from the received request packet, which includes the one or more processors being further configured to identify specific criteria including an IP address of the controller computer and an identification of the transmitting device; and populate the table with the identified specific criteria. In another example, when the transmitting device goes down, receive a new packet from a new transmitting device; and replace, in the populated table, an indication of the transmitting device that has gone down with a new indication of the new transmitting device. As another example, when the response packet is not confirmed at the controller computer, prohibit sending of future response packets to the IP address of the controller computer for a period of time. The system may also receive a set of routing data from the controller computer; verify the accuracy of the routing data in the populated table by comparing the identified routing data with the received set of routing data; and when the set of routing is not the same as the identified routing data, replace the identified routing data with the set of routing data. In another example, the system may verify a digital signature in the received request packet to ensure the received request packet originated from the controller computer. In another example, when the connection is established with the controller computer, receive a second set of routing data from the controller computer, the second set of routing data including information as to where to transmit data packets; use the second set of routing data when transmitting the data packets; and not use the identified routing data in the populated table to transmit the data packets.

Another aspect of the disclosure discloses a non-transitory computer-readable storage medium on which computer readable instructions of a program are stored, the instructions, when executed by one or more processors, cause the one or more processors to perform a method that includes receiving a request packet from a transmitting device, the request packet originating from a controller computer; when the received request packet enters one of a plurality of designated ports, identifying, using one or more processors, routing data from the received request packet, the routing data indicating a path to respond to the controller computer; populating, using the one or more processors, a table using the identified routing data of the request packet; sending, using the one or more processors, a response packet to the controller computer using the identified routing data in the populated table; receiving an answer packet from the controller computer based on the sent response packet; and establishing, using the one or more processors, a connection with the controller computer based on the request packet, the response packet, and the answer packet.

As another example, the medium includes instructions for identifying specific criteria including an IP address of the controller computer and an identification of the transmitting device; and populating the table with the identified specific criteria. In that example, the medium includes instructions for, when the transmitting device goes down, receiving a new packet from a new transmitting device; and replacing, in the populated table, an indication of the transmitting device that has gone down with a new indication of the new transmitting device. As another example, the medium includes instructions for, when the response packet is not confirmed at the controller computer, prohibiting sending of future response packets to the IP address of the controller computer for a period of time. In another example, the medium includes instructions for receiving a set of routing data from the controller computer; verifying the accuracy of the routing data in the populated table by comparing the identified routing data with the received set of routing data; and when the set of routing is not the same as the identified routing data, replacing the identified routing data with the set of routing data. As another example, the medium includes instructions for verifying a digital signature in the received request packet to ensure the received request packet originated from the controller computer.

BRIEF DESCRIPTION OF THE DRAWINGS

FIGS. 6A and 6B are examples illustrating sending a response packet to a master controller and the master controller sending an acknowledgment packet in accordance with aspects of the disclosure.

FIG. 7 is an example illustrating a connection between a master controller and a target switch in accordance with aspects of the disclosure.

DETAILED DESCRIPTION

Figure 1:
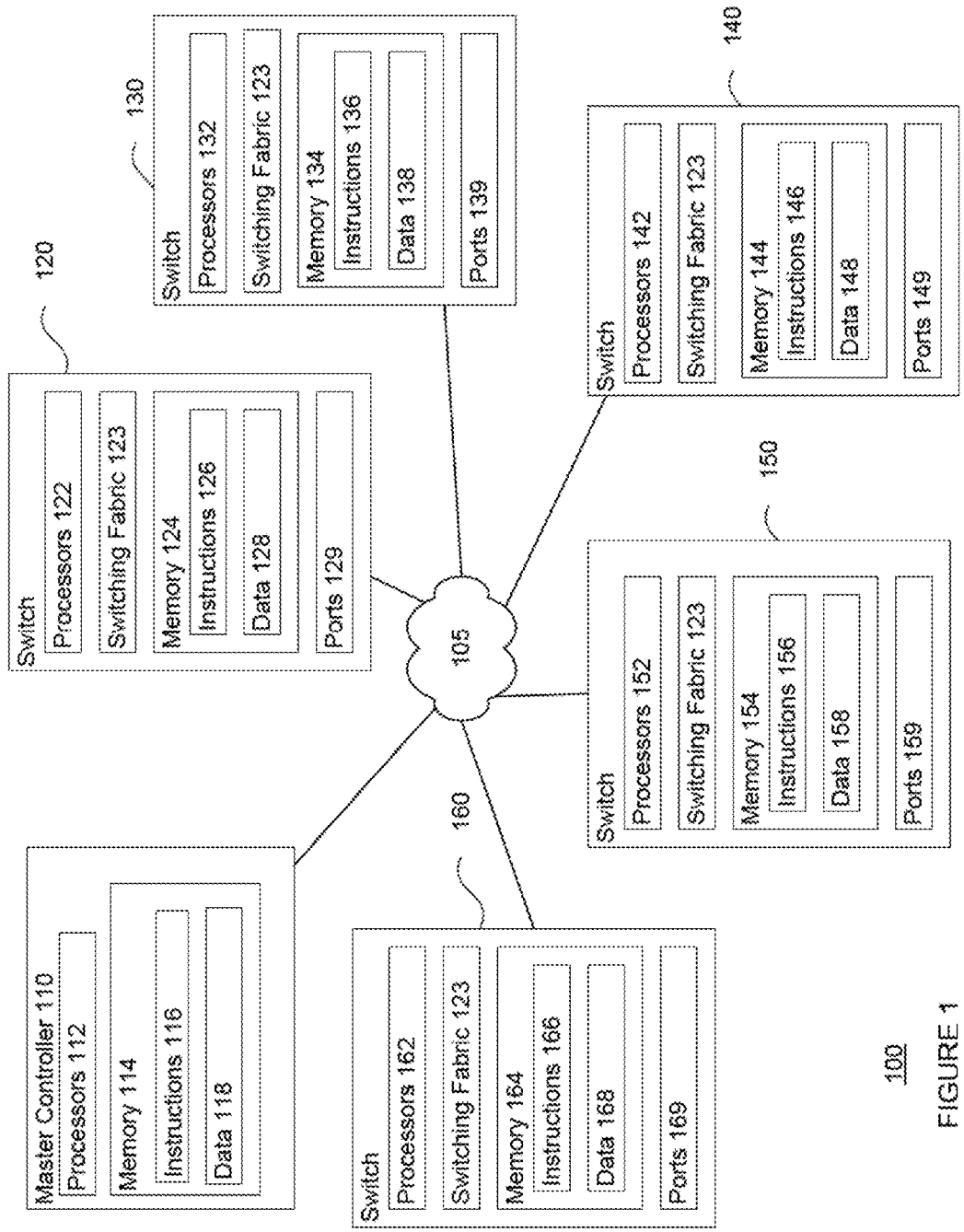
FIG. 1 is a functional diagram of an example system in accordance with aspects of the disclosure.

Aspects of the technology relate generally to switches responding to master controllers before establishing a secure TCP connection in an in-band controlled network. When a master controller attempts to indirectly connect to a second switch through the use of a first switch by sending a packet, the second switch may generate and populate a table after receiving the packet. By populating this table, the switch may establish a path to respond to the master controller on a network. After the second switch sends its response, a secure connection may be established between the two devices shortly thereafter.

The master controller may send a synchronize ("SYN") packet to a switch, the switch responds with a synchronize and acknowledgement ("SYN+ACK") packet, and then the controller responds with an acknowledgement ("ACK") packet to complete the connection. This process to establish a connection between devices is referred to, in one example, as a three-way handshake. In other examples, a second switch may not be directly connected to the master controller. Rather, the second switch may be connected to a first switch, the first switch of which is in turn connected to the master controller. In addition, the second switch may be connected to multiple switches that may or may not be connected to the master controller.

In this regard, the master controller may send a SYN packet, for example, to the second switch via the first switch. Because there is not an established connection between the master controller and the second switch, the second switch may not know which interface (or switch) to use to respond to the master controller. As a result, when the second switch receives the SYN packet, the second switch will generate and populate a table with information that will indicate a path to send a response packet to the master controller. In this regard, a switch, such as the second switch, may learn and store information in a table for each master controller that the switch receives a packet from.

In order for the second switch to acquire the information necessary to populate the table, the master controller may send the packet to specific ports of the second switch. Once the second switch obtains a packet via at least one designated port, the second switch may learn and store the necessary information to populate the table.

The populated table may include the IP address of the master controller and the last interface used (e.g., the first switch). This information may give the second switch a path for outgoing management of connections with the master controller. Once the switch knows the path to respond to the master controller, a secure connection using TCP may be established between the two devices In another example, a switch on the network may alter its own populated table if one of the interfaces goes down. For instance, if the first switch goes down and the second switch receives packets from a third switch, then the third switch may replace the first switch as the last interface used in the table.

In another example, a switch may learn and store information in the table only until a secure connection is established with the master controller. When a secure connection is established between the switch and the master controller, the switch will re-evaluate the table to verify the accuracy of the information. In another example, a digital signature may be added to the packets the master controller sends. In this instance, the switch may verify the packet's signature upon receipt, and determine whether the SYN packet is from a viable source or not (e.g., a spoofing attack).

As a further example, the switch may generate a table only if the switch is not connected to a master controller. Otherwise, if the switch is connected to a master controller, the master controller will be responsible to program the correct outgoing interface for the switch. In yet another example, the switch's table may be verified by confirmation over a secure channel. For example, if the response from the switch can be verified at the master controller, then the outgoing interface path may be confirmed. On the other hand, if the switch's outgoing interface cannot be confirmed, then the switch will ban that particular interface for a period of time. This may prevent a Denial of Service attack from a particular interface.

FIG. 1 illustrates an example system 100 in which the features described above may be implemented. It should not be considered as limiting the scope of the disclosure or usefulness of the features described herein. As shown, system 100 includes as a master controller 110 and a plurality of switches 120, 130, 140, 150 and 160 interconnected via network 105.

The switches may be any computing device which is capable of sending and receiving data. Switch 120 contains one or more processors 122, memory 124 and other components typically present in switching devices. Memory 124 of switch 120 can store information accessible by one or more processors 122, including instructions 126 that can be executed by the one or more processors 122. The switching device may include a switching fabric 123 for forwarding the data frames (or packets) that the switch 120 receives. The method in which the switching fabric 123 forwards these frames may be controlled by the processors 122. The switching device may also include ports (not shown) for ingress and egress of data frames.

The processors on the switches may receive input and provide output as necessary. As an example, processors 122 of switch 120 may be responsible for handling system instructions 126, including where to transmit data.

Memory 124 stores information that is accessible by the processors 122 including instructions 126 that may be executed by the processors 122 and data 128. The memory 124 may include any type of non-transitory memory operative to store information accessible by the processor 122, or other medium that stores data that may be read with the aid of an electronic device. This may include a hard-drive, memory card, read-only memory ("ROM"), or random access memory ("RAM").

The instructions 126 may be any set of instructions to be executed directly (such as machine code) or indirectly (such as scripts) by the processors 122. For example, the instructions 126 may be stored as computer code on the computer-readable medium. The instructions 126 may be stored in object code format for direct processing by the processor 122 or in any other computer language including scripts or collections of independent source code modules that are interpreted on demand or compiled in advance. Instructions 126 may include where certain data packets should be sent upon receipt of the data packets.

The data 128 may be retrieved, stored or modified by the processors 122 in accordance with the instructions 126. For instance, although the system and method is not limited by any particular data structure, the data 128 may be stored in computer registers and the data may be formatted in any computer-readable format. The data may be stored in forwarding tables which include the addresses and output ports that the processor 122 may access to know where to send data packets.

Each processor 122 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

Switch 130 may contain one or more processors 132, memory 134, instructions 136, and data 138, which may function similarly as described above with regard to processors 122, memory 124, instructions 126, and data 128 of switch 120. Switch 140 may contain one or more processors 142, memory 144, instructions 146, and data 148, which may function similarly as described above with regard to processors 122, memory 124, instructions 126, and data 128 of switch 120. Switch 150 may contain one or more processors 152, memory 154, instructions 156, and data 158, which may function similarly as described above with regard to processors 122, memory 124, instructions 126, and data 128 of switch 120. Switch 160 may contain one or more processors 162, memory 164, instructions 166, and data 168, which may function similarly as described above with regard to processors 122, memory 124, instructions 126, and data 128 of switch 120.

Master controller 110 may be any type of computing device capable of programming switches and transmitting instructions to a switch, for example, using a given protocol. As shown, the master controller comprises a memory 114, including instructions 116 and data 118, and one or more processors 112, which may function similarly as described above with regard to processors 122, memory 124, instructions 126, and data 128 of switch 120.

Switches 120, 130, 140, 150 and 160 and master controller 110 can be at various nodes of the network 105 and are capable of directly and indirectly communicating with other nodes of the network. Although only a few computing devices are depicted in FIG. 1, it should be appreciated that a typical system can include a large number of connected computing devices, with each different device being at a different node of the network 105. Computing devices may include at least switches, controllers, servers and personal computers. The network 105 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As noted above, in TCP networks the three-way handshake may be required in order to establish a connection between devices. In example 200 of FIG. 2, master controller 110 may seek to establish a connection with switch 120. In this regard, the master controller 110 may send a SYN packet to switch 120. Switch 120 may respond by sending a SYN+ACK packet to master controller 110. To finalize the connection, the master controller 110 may respond to the switch 120 with an ACK packet. The master controller 110 may similarly establish a connection with any directly connected switch, such as switch 130. In this regard, the direct connection between the master controller and the switch indicates that there are no intermediary switches in the connection between the master controller and the switch.

Figure 2:
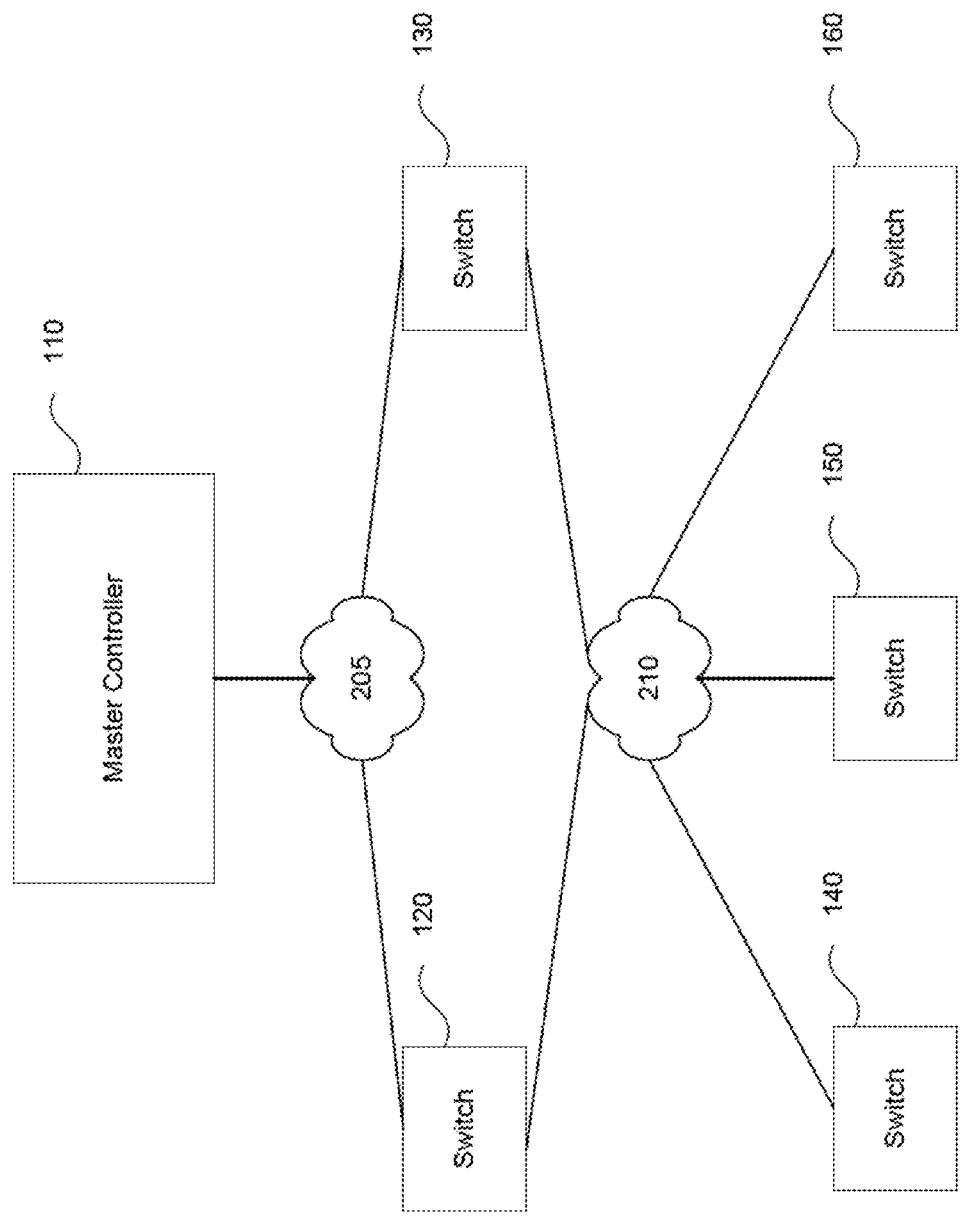
FIG. 2 is a pictorial diagram of the system of FIG. 1.

In some aspects, a master controller may seek to establish a connection with a switch through the use of another switch. Example 200 of FIG. 2 shows the master controller 110 directly connected to switches 120 and 130 over network 205. In other words, there are no intermediary switches between the master controller 110 and switch 120, or between the master controller 110 and switch 130. In this regard, master controller 110 may not have a direct connection with switches 140, 150, and 160; rather, the master controller 110 has an indirect connection with switches 140, 150, and 160. The indirect connection is when the master controller communicates with a switch through the use of at least one other intermediate switch. As shown in example 200 of FIG. 2, the master controller 110 may need to communicate through switch 120 and/or switch 130 as a medium or intermediary in order to connect with switches 140, 150 and 160. In this regard, switches 120 and 130 may be considered intermediary switches and switches 140, 150 and 160 may be considered target switches.

Figure 3:
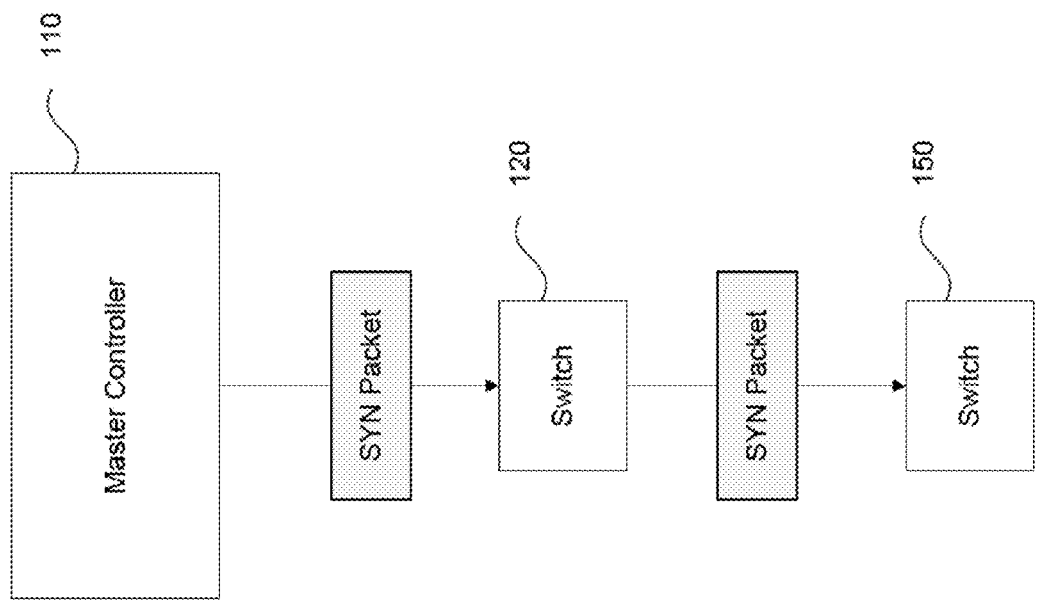
FIG. 3 is an example diagram illustrating sending a packet to a target switch in accordance with aspects of the disclosure.

When the master controller seeks to initiate a connection with a target switch, the master controller may send a packet through an intermediary switch. For example, in example 200, master controller 110 may want to establish a connection with target switch 150. In this regard, the master controller sends a packet to an intermediary switch, which will then forward the packet to target switch 150. For instance, example 300 of FIG. 3 shows the master controller 110 sending a SYN packet to intermediary switch 120, and the intermediary switch 120 forwarding the same SYN packet to target switch 150. Alternatively, a master controller may send a SYN packet to any intermediary switch as a means to transmit a packet to any target switch. For example, referring back to example 200 of FIG. 2, if the master controller 110 wants to send a packet to target switch 140, then master controller 110 may send a packet to intermediary switch 130. From here, the intermediary switch 130 may forward the received SYN packet to target switch 140.

Figure 4:
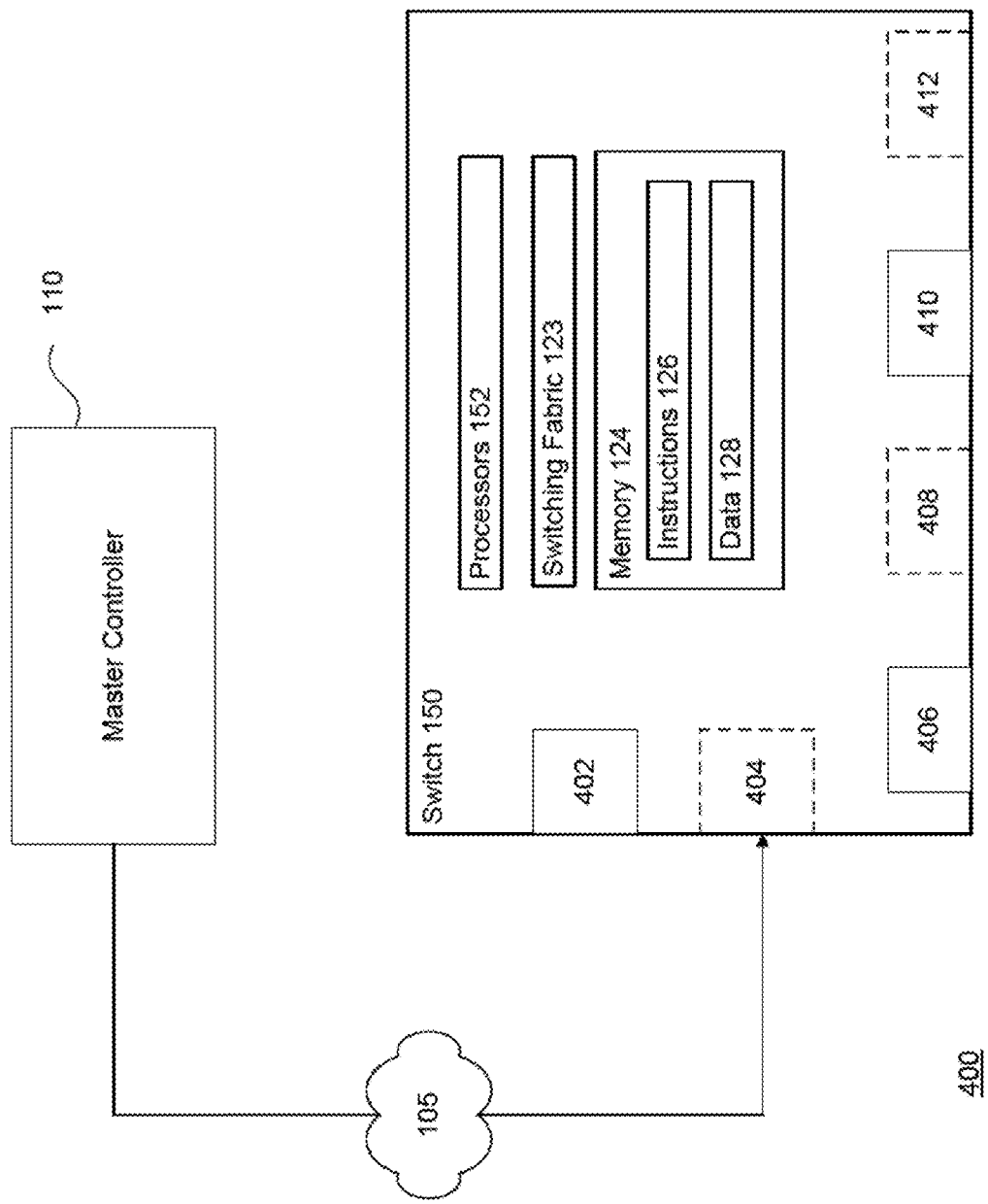
FIG. 4 is an example diagram illustrating receiving a packet in a designated port in accordance with aspects of the disclosure.

After the target switch receives the packet, the target switch may determine whether certain conditions are met. One condition may be that the received packet originated from a controller, such as master controller 110. An example of this condition may be seen in example 400 of FIG. 4, where master controller 110 sends a packet to target switch 150. Another condition may be that the received request packet entered a designated port of the target switch. In example 400, target switch 150 includes a plurality of ports 402, 404, 406, 408, 410 and 412, the designated ports 404, 408 and 412 of which are indicated by dotted lines. In this example, the condition is satisfied because the received packet sent from the master controller 110 enters designated port 404.

Before or after the target switch determines whether the conditions are met, the target switch may identify certain data from the received packet. The identified data is used to ascertain a path to the controller computer 110. In this regard, the data may be considered routing data. By way of example only, the gathered routing data may include the IP address of the master controller and the last interface used to transmit the packet to the target switch.

Figure 5:
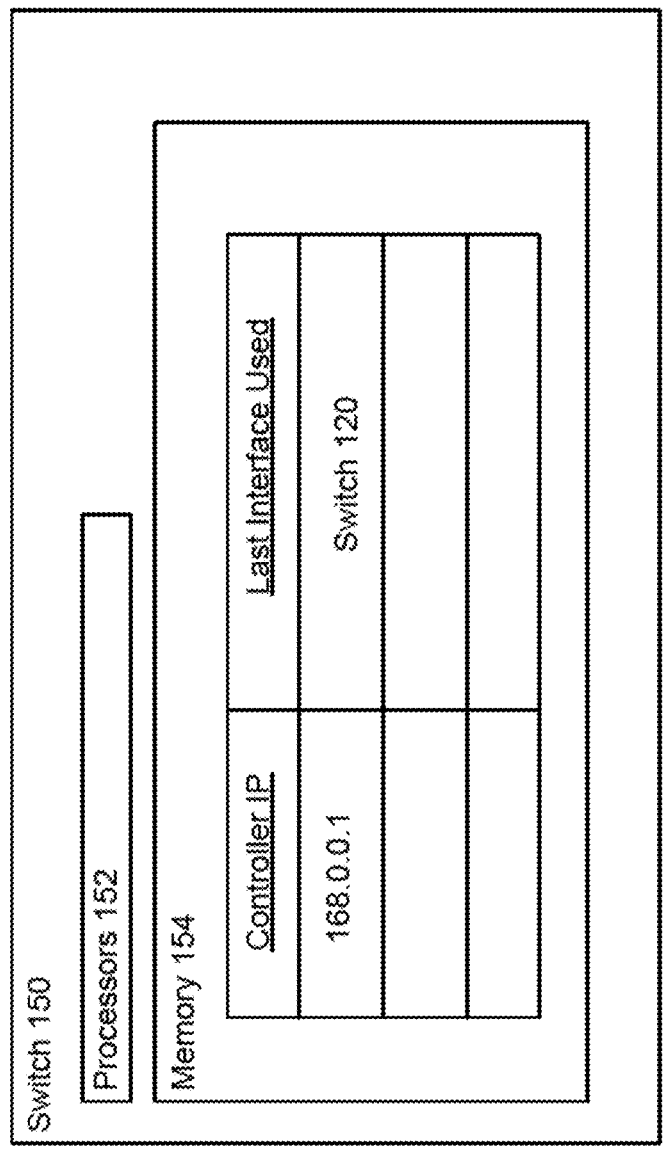
FIG. 5 is an example diagram of a table in accordance with aspects of the disclosure.

In one aspect, the target switch populates a table with the identified routing data. For example, as shown in example 500 of FIG. 5, the target switch 150 populates the table with routing data to identify a path to the controller computer 110. The routing data in the populated table included the master controller's IP address and the last interface that sent the SYN packet to the target switch, here switch 120.

The target switch is able to respond to the master controller with the routing data in the populated table. The target switch may respond to the master controller, for example, by sending a SYN+ACK packet to the master controller. As shown in example 600 of FIG. 6A, the target switch 150 sends the response to intermediary switch 120. The intermediary switch 120 may be used because it was the last interface used, as shown in the populated table in example 500 of FIG. 5. In addition, using the stored IP address of the master controller 110, as shown in example 500 of FIG. 5, the target switch sends the SYN+ACK packet to the appropriate IP address. The target switch sends this stored IP address with the SYN+ACK packet to the intermediary switch 120 so that the intermediary switch 120 knows where to forward the SYN+ACK packet. Example 600 illustrates the target switch sending the SYN+ACK packet to intermediary switch 120, and intermediary switch 120 forwarding the received packet to the master controller 110.

After the target switch responds to the master controller, an established TCP connection between the two devices may be established. For example, as shown in example 600, the master controller 110 receives the SYN+ACK packet from target switch 150. And, example 650 of FIG. 6B shows the master controller 110 sending an ACK packet back to the target switch 150 via intermediary switch 120. Upon the target switch 150 receiving the ACK packet, a secure TCP connection is established, concluding the three-way handshake. As a result, example 700 of FIG. 7 illustrates that a connection between the master controller 110 and the target switch 150 has been established.

Figure 8:
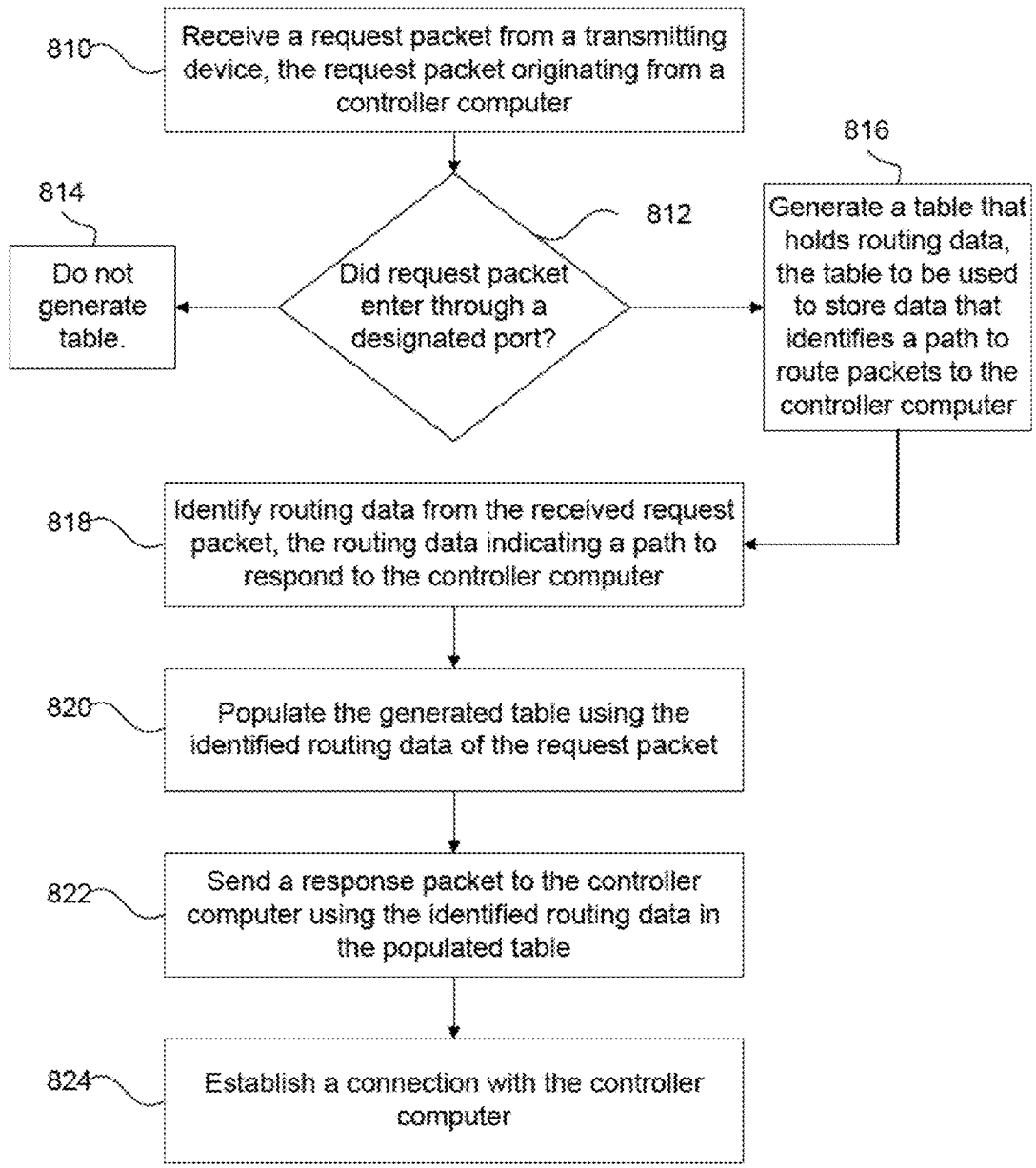
FIG. 8 is a flow diagram in accordance with aspects of the disclosure.

FIG. 8 is an example flow diagram 800 of certain features described above, which may be performed by one or more computing devices, such as master controller 110 and/or switches 120, 130, 140, 150, and 160. In this example, a computing device receives a request packet from a transmitting device at block 810. The request packet originates from a controller computer. The computing device then determines whether the request packet entered through a designated port of the computing device at block 812. If no, then the computing device will not generate a table, as shown at block 814. If yes, then the computing device generates a table that holds routing data at block 816. The table is used to store data that identifies a path for the computing device to route packets to the controller computer at block 816. The computing device then identifies routing data from the received request packet at block 818. Once the routing data is identified, the computing device may populate the generated table using the identified routing data of the received request packet at block 820. Once the table is populated, the computing device sends a response packet to the controller computing using the identified routing data in the populated table, as shown at block 822. Once the computing device receives the final packet, the computing device establishes a connection with the controller computer at block 824.

If one of the intermediary switches or interfaces on the network goes down, the target switches may alter the populated tables to reflect this change. For instance, referring back to example 200, target switch 150 may be communicating with master controller 110 through intermediary switch 120. If intermediary switch 120 goes down, then target switch 150 may receive a packet from intermediary switch 130 instead. In this case, target switch 150 may replace intermediary switch 120 as the "last interface used" with intermediary switch 130.

A target switch may also learn and store information in a table only until a secure connection is established with the master controller. When a secure connection is established between the target switch and the master controller, the target switch may re-evaluate the data in the table to verify the accuracy of the information. By way of example, the master controller may program the switch by sending the necessary data (e.g. routing data) to the target switch. In this regard, the target switch may use the routing data that it receives from the master controller to communicate with the master controller.

In another example, a digital signature may be added to the packets the master controller sends. In this instance, the target switch may verify the packet's signature upon receipt, and determine whether the packet is from a viable source or not (e.g., a potential spoofing attack). By way of example only, the master controller may the SYN packet to the target switch by using a private key. Upon receipt of the private key, the target switch may decode the private key by using a public or private key of its own, thereby determining the viability of the original source.

As another example, the target switch may generate a table only if the target switch is not connected to a master controller. Otherwise, if the target switch is connected to a master controller, the master controller will be responsible for programming the correct outgoing interface for the target switch. For example, in one scenario if a secure connection between a master controller and a target switch is already established, the master controller will be responsible, in this example, for programming a viable outgoing interface for the target switch to follow. In addition, the target switch may not have to populate a table in this scenario.

The target switch's table may also be verified by confirmation over a secure channel. For example, if the response from the target switch can be verified at the master controller, then the IP address may be confirmed. In this case, if the target switch's stored IP address cannot be confirmed, then the target switch will ban that particular IP address for a period of time. This may prevent a potential Denial of Service attack from a particular interface. For instance, the period of time may be on the order of tens of seconds. By way of example only, the period of time may be 30 seconds. In another example, the period of time may be between 10-60 seconds, although the time period may be longer or shorter.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of in-band centralized control of a software-defined network, comprising:
   receiving, at a designated port of a first network device, a request packet from a second network device, the request packet originating from a controller computer separate from the second network device;
   identifying, using one or more processors of the first network device, routing data from the request packet, the routing data indicating a path to respond to the controller computer via the second network device;
   populating, using the one or more processors, a table using the routing data, wherein populating the table includes populating the table with an IP address of the controller computer and an identification of the second network device;
   sending, using the one or more processors, a response packet to the controller computer using the routing data in the table;
   receiving, at the first network device, an answer packet from the controller computer; and
   establishing, using the one or more processors, a software-defined networking control connection with the controller computer via the second network device based on the request packet, the response packet, and the answer packet.

2. The method of claim 1, further comprising:
   receiving, at the first network device, an indication that the second network device has gone offline;
   receiving, at the first network device, a new packet from a third network device;
   identifying, using the one or more processors, second routing data from the new packet, the second routing data indicating a second path to respond to the controller computer via the third network device; and
   replacing, in the table, the routing data with the second routing data.

3. The method of claim 1, further comprising, when the response packet is not confirmed at the controller computer, prohibiting sending of future response packets to the IP address of the controller computer for a period of time.

4. The method of claim 1, further comprising:
   receiving, at the first network device, a set of routing data from the controller computer;
   determining, by the one or more processors, that the routing data in the table is not the same as the set of routing data; and
   replacing, by the one or more processors responsive to the determination, the routing data in the table with the set of routing data.

5. The method of claim 1, further comprising verifying, by the one or more processors, a digital signature in the request packet to ensure the request packet originated from the controller computer.

6. The method of claim 1, further comprising:
   receiving, at the first network device, a second set of routing data from the controller computer, the second set of routing data including information as to where to transmit data packets; and
   using the second set of routing data instead of the routing data when transmitting the data packets.

7. A system for in-band centralized control of a software-defined network, the system comprising a first network device comprising one or more processors configured to:
   receive, at a designated port of the first network device, a request packet from a second network device, the request packet originating from a controller computer separate from the second network device;
   identify routing data from the received request packet, the routing data indicating a path to respond to the controller computer via the second network device;
   populate a table using the routing data wherein populating the table includes populating the table with an IP address of the controller computer and an identification of the second network device;

send a response packet to the controller computer using the routing data in the table;
receive an answer packet from the controller computer; and
establish a software-defined networking control connection with the controller computer via the second network device based on the request packet, the response packet, and the answer packet.

8. The system of claim 7, wherein the one or more processors are further configured to:
receive an indication that the second network device has gone offline;
receive a new packet from a third network device;
identify second routing data from the new packet, the second routing data indicating a second path to respond to the controller computer via the third network device; and
replace, in the table, the routing data with the second routing data.

9. The system of claim 7, wherein the one or more processors are further configured to, when the response packet is not confirmed at the controller computer, prohibit sending of future response packets to the IP address of the controller computer for a period of time.

10. The system of claim 7, wherein the one or more processors are further configured to:
receive a set of routing data from the controller computer;
determine that the routing data in the table is not the same as the set of routing data; and
replace, responsive to the determination, the routing data in the table with the set of routing data.

11. The system of claim 7, wherein the one or more processors are further configured to verify a digital signature in the request packet to ensure the request packet originated from the controller computer.

12. The system of claim 7, wherein the one or more processors are further configured to:
receive a second set of routing data from the controller computer, the second set of routing data including information as to where to transmit data packets; and
use the second set of routing data instead of the routing data when transmitting the data packets.

13. A non-transitory computer-readable storage medium on which computer readable instructions of a program are stored, the instructions, when executed by one or more processors, cause the one or more processors to perform a method comprising:
receiving, at a designated port of a first network device, a request packet from a second network device, the request packet originating from a controller computer separate from the second network device;
identifying, using one or more processors of the first network device, routing data from the request packet, the routing data indicating a path to respond to the controller computer via the second network device;
populating, using the one or more processors, a table using the routing data wherein populating the table includes populating the table with an IP address of the controller computer and an identification of the second network device;
sending, using the one or more processors, a response packet to the controller computer using the routing data in the table;
receiving, at the first network device, an answer packet from the controller computer; and
establishing, using the one or more processors, a software-defined networking control connection with the controller computer via the second network device based on the request packet, the response packet, and the answer packet.

14. The medium of claim 13, wherein the method further comprises:
receiving, at the first network device, an indication that the second network device has gone offline;
receiving, at the first network device, a new packet from a third network device;
identifying, using the one or more processors, second routing data from the new packet, the second routing data indicating a second path to respond to the controller computer via the third network device; and
replacing, in the table, the routing data with the second routing data.

15. The medium of claim 13, wherein the method further comprises, when the response packet is not confirmed at the controller computer, prohibiting sending of future response packets to the IP address of the controller computer for a period of time.

16. The medium of claim 13, wherein the method further comprises:
receiving, at the first network device, a set of routing data from the controller computer;
determining, by the one or more processors, that the routing data in the table is not the same as the set of routing data; and
replacing, by the one or more processors responsive to the determination, the routing data in the table with the set of routing data.

17. The medium of claim 13, wherein the method further comprises verifying, by the one or more processors, a digital signature in the request packet to ensure the request packet originated from the controller computer.

* * * * *